de Geus

United States Patent [19]

[11] 4,081,967

[45] Apr. 4, 1978

[54] CLOSED CYCLE SOLAR GENERATOR

[76] Inventor: Arie M. deGeus, 6625 4th St. South, St. Petersburg, Fla. 33705

[21] Appl. No.: 783,422

[22] Filed: Mar. 31, 1977

[51] Int. Cl.² .............................................. F03G 7/02
[52] U.S. Cl. ........................................ 60/641; 60/650
[58] Field of Search ............... 60/641, 650, 651, 670, 60/671, 682, 695; 290/52, 1 R

[56] References Cited

U.S. PATENT DOCUMENTS

| | | | |
|---|---|---|---|
| 2,453,928 | 11/1948 | Oechslin | 60/682 |
| 3,514,942 | 6/1970 | Kyryluk | 60/641 |
| 4,002,032 | 1/1977 | Bash | 60/641 |

Primary Examiner—Allen M. Ostrager
Assistant Examiner—Stephen F. Husar
Attorney, Agent, or Firm—Dressler, Goldsmith, Clement, Gordon & Shore, Ltd.

[57] ABSTRACT

A closed cycle solar operated power generator is provided in which a tubular heat collector positioned concentrically within a transparent tube sealed at one end is radiantly heated and a compressor takes gas at low temperature and pressure and supplies it to the open end of the transparent tube at an elevated pressure. The compressed gas passes through the transparent tube outside of said tubular collector and then returns to the open end thereof inside of the tubular collector to a turbine positioned within a housing sealed to the tubular collector. The turbine exhaust passes through a heat exchanger to heat the compressed gases entering the transparent tube, and the cooled exhaust enters a conductive tube sealed at one end and having its open end sealed to the open end of the transparent tube. The conductive tube is cooled by conduction or radiation to further cool the exhaust which then returns to the compressor through a tubular compressor inlet to complete the closed cycle.

6 Claims, 4 Drawing Figures

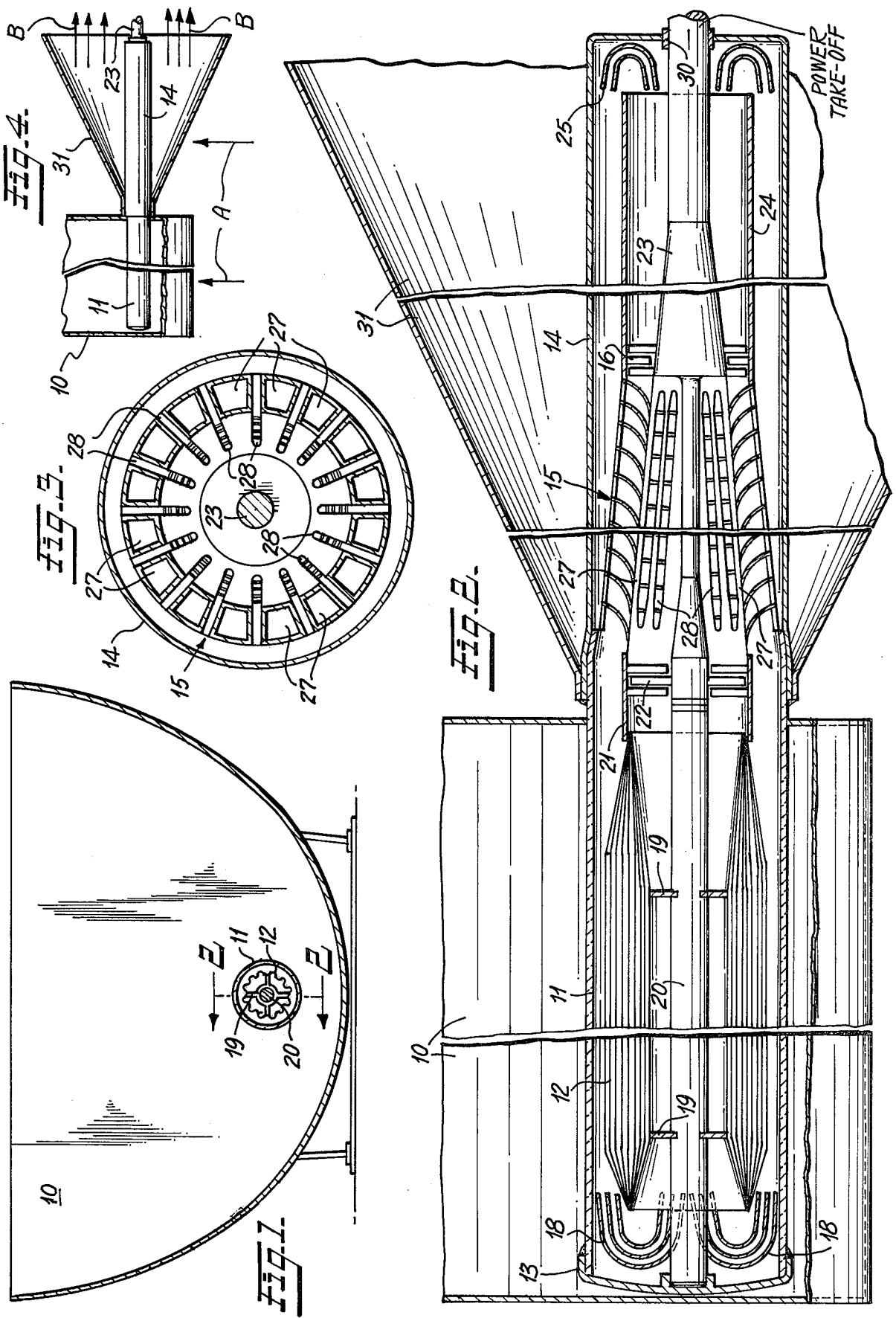

CLOSED CYCLE SOLAR GENERATOR

The present invention relates to solar heaters which are particularly adapted for the generation of electrical power in space, though it is useful on earth with proper cooling.

Photovoltaic cells have been used for the generation of electrical energy in space, but these only convert about 20% of the incident solar radiation into electrical energy, so an improved conversion efficiency is clearly desirable. It is estimated in this invention that in space the conversion of solar radiation to electrical power can exceed 50%.

In accordance with this invention, a gas at low temperature is compressed through a heat exchanger into the annular space between the open end of a transparent tube which is sealed at the other end and a tubular heat collector which receives solar radiation which has been concentrated by suitable reflector means and the compressed gas moves to the sealed end of the transparent tube and returns within the tubular heat collector, being heated progressively as it moves. A turbine is positioned within a housing constituting an extension of the heat collector and is expanded through the turbine, the turbine exhaust passing through the said heat exchanger into an annular chamber between a tubular compressor inlet and the open end of a conductive tube which is sealed to the open end of the transparent tube, the other end of the conductive tube being sealed. The expanded gases pass through the conductive tube and return to the compressor within the tubular compressor inlet, being cooled progressively as it moves, and thus completing the closed cycle. The turbine and compressor are on a common shaft which extends beyond the sealed together tubes for power output. In space, the conductive tube is surrounded with a conical shield to facilitate radiant heat loss and to shield the cooling zone against solar radiation. On earth, the conductive tube can be cooled with water or other collant.

One principal on which the present invention relies is that it takes less energy to compress a gas at low temperature than the same gas can deliver when it is expanded at high temperature. Thus, when solar energy is used to heat the gas after it has been compressed, expansion of the heated compressed gas will deliver more power than is consumed by the compressor. The efficiency of the system increases with increasing temperature differential. While air can be used as the gas, Fluorinated hydrocarbons, such as Freon 11 or Feon 12 and other gases having a relatively low specific heat and other suitable thermodynamic properties, are preferred since they provide a greater efficiency in the conversion of radiant energy to electrical energy. Of course, the selected fluid must be a gas over the full range of temperature encountered in the system.

The invention will be more fully understood from the accompanying drawings in which:

FIG. 1 is a diagrammatic cross-sectional sketch showing a parabolic reflector with a transparent tube extending along its focus, said tube providing the heating section of the power generator of this invention;

FIG. 2 is a longitudinal cross-section taken through the transparent tube along the line 2—2 of FIG. 1, and showing the limits of the reflector and the associated cooling section;

FIG. 3 is a cross-section taken through the turbine exhaust and showing the heat exchange section wherein a portion of the thermal energy contained within the turbine exhaust gases is recovered by the compressed inlet air; and FIG. 4 is a side elevation on a greatly reduced scale with the cooling shield and heat reflector in cross-section to show the over all structure.

Referring more particularly to FIG. 1, 10 identifies a parabolic reflector having a transparent tube 11 positioned at the focus of the reflector. Concentrically positioned within the tube 11 is a tubular heat collector 12. As will be apparent, the reflector 10 concentrates the solar energy upon the tubular heat collector 12 which is preferably constituted by a sheet of corrugated metal having a heat absorptive outer coating and welded to itself to form a tube which is open at both ends. The corrugations increase the surface area and this is helpful to increase the heat exchange area, but this is not essential. On earth, the reflector may be movable to follow the sun to whatever extent is desired, but this is not an aspect of this invention.

Referring to FIG. 2, it will be seen that tube 11 is closed at one end, in the instance by a cap 13, and the other end is connected to a conductive tube 14 within which is sealed an exhaust duct system 15 which functions as a heat exchanger to transfer as large a portion as possible of the residual heat in the turbine exhaust to the compressed gas which is introduced into the heating zone of the system. The compressor 16 is associated with the exhaust system 15, serving to transport compressed gas through ducts 27 so as to recover heat from the turbine exhaust gases.

Following the gas through the system, the pressure is raised by the compressor into the range of 2-30 atmospheres, depending on the gas selected, though this invention is not limited to any particular pressure range. At any given turbine inlet temperature, the efficiency of the generator is importantly tied to the temperature of the gas at the compressor inlet, the lower the temperature, the higher the efficiency. The compressed air then passes through the heat exchanger 15, where contact with the hot exhaust ducts 28 raises the temperature, and thus enters the inlet of the transparent tube 11 in the annular space between the tubular collector 12 and the tube 11.

The compressed gas then passes through the tube 11 in contact with the outside of the collector 12, being heated all the while, and vanes 18 guide the gas around the open end of the collector 12 and into the interior of the tubular collector. The vanes 18 reduced frictional losses, but are not essential.

A solid core 20 extends through the interior of the collector 12, being supported at one end by the cap 13. The solid core 20 carries spiders 19 which help to support the collector 12. Contact of the compressed gas with the interior of collector 12 serves to maximize the temperature which is obtained at the turbine inlet which should be as high as possible for maximum operating efficiency.

At the inner end of the collector 12 is a housing 21 which is sealed to the collector 12 to prevent incoming compressed gas from being diverted to the turbine 22 before is it fully heated. The turbine 22 is mounted within the housing 21 on a shaft 23 which is secured by means of suitable bearings (not shown) to the core 20. As will also be apparent, compressor 16 is mounted on the same shaft 23, and this shaft extends through the packings 30 to enable the power generated to be utilized outside the conductive tube 14, as for example for the operation of an electrical generator.

The turbine 22 can be a single stage or a multi stage turbine depending upon the thermodynamic properties of the gas which is employed and the pressure ratio selected for use therewith. The turbine exhausts through ducts 28 which serve as heat exchangers as previously described. On earth, water or other coolant would be passed over the tube 14 to remove heat. Tube 14 has been shown as a cylinder for ease of illustration, but it is preferably convoluted or finned for maximum heat transfer surface area. Also, and in space, the outer surface of tube 14 can be coated to maximize radiant emission. In space, a conical shield 31 receives radiant energy from tube 14 and transmits it to outer space. In FIG. 4, the solar radiation is identified by arrows A, and the release of radiation is shown by arrows B. Interestingly, the concentration of heat by reflector 10 causes radiation B to provide a small but steady propulsive force by reaction. The shield 31 is preferably made of reflective metal and it also serves to shade tube 14 from the solar radiation A. The narrow end of shield 31 is near the reflector.

The construction of the exhaust duct system 15 is more fully shown in FIG. 3 where it will be clear that the entering compressed gas moves through ducts 27 in heat exchange relationship to the exhaust ducts 28. The vanes in ducts 28 are optional.

After passing through heat exchanger 15, the turbine exhaust gas passes through the annular space between a tubular compressor inlet 24 and the conductive tube 14. Since the turbine exhaust contains considerable heat, this heat is transferred to the tube 14 and is carried away either by conduction to some coolant (one can heat a large amount of water using this invention) or by radiation to the conical shield 31. Upon reaching the closed end of tube 14, the gas flow is reversed using vanes 25 and thus enters the annular space between the tubular compressor inlet 24 and the power take-off shaft 23. This completes the closed cycle since it brings the now cooled gas back to the compressor 16. The tubular compressor inlet 24 is desirably an opaque insulator to minimize reheating of the gas supplied to compressor 16.

As will be apparent, the power generator is started by rotating the shaft 23, as with a starter motor, but start-up procedure is conventional. As soon as the turbine exhaust gases are hot, the power generator produces a surplus of energy, so the external power used for starting may be discontinued. Ordinary starting should be completed in about 30 seconds to 1 minute on earth, and more rapidly in space.

I claim:

1. A closed cycle solar operated power generator comprising a transparent tube contained within reflective means for concentrating solar energy upon said transparent tube, said transparent tube being sealed at one end and having a tubular collector of radiant heat positioned concentrically within the same, compressor means for taking gas at low temperature and pressure and supplying it to the open end of said transparent tube at an elevated pressure, said compressed gas passing through said transparent tube outside of said tubular collector and then returning to the open end of said transparent tube inside of said tubular collector to a turbine positioned within a housing sealed to said tubular collector, a heat exchanger for receiving the turbine exhaust and for transferring heat therefrom to the compressed gases entering said transparent tube, a conductive tube sealed at one end having its open end sealed to the open end of the transparent tube, said conductive tube receiving the turbine exhaust from said heat exchanger, means for removing heat from said conductive tube, and a tubular compressor inlet for returning cooled gas passing through said conductive tube to said compressor to complete the closed cycle.

2. A closed cycle solar operated power generator as recited in claim 1 in which said turbine and said compressor are mounted on a single shaft.

3. A closed cycle solar operated power generator as recited in claim 2 in which vanes are positioned at the sealed ends of each of said tubes to guide the gas where its path is reversed.

4. A closed cycle solar operated power generator as recited in claim 1 in which said collector of radiant heat is constituted by a thin metal sheet convoluted to form a tube with a large heat exchange surface.

5. A closed cycle solar operated power generator as recited in claim 1 in which said reflective means is constituted by a parabolic reflector, the ratio of reflector opening to collector diameter being at least 10:1.

6. A closed cycle solar operated power generator as recited in claim 1 in which said conductive tube is surrounded by a conical shield having its narrow end near said reflector.

* * * * *